US012576488B2

(12) United States Patent
Radif

(10) Patent No.: US 12,576,488 B2
(45) Date of Patent: Mar. 17, 2026

(54) POWER TOOL ATTACHMENT PART

(71) Applicant: ATLAS COPCO INDUSTRIAL TECHNIQUE AB, Stockholm (SE)

(72) Inventor: Nabil Khalil Radif, Nacka (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 572 days.

(21) Appl. No.: 17/627,420

(22) PCT Filed: Jul. 6, 2020

(86) PCT No.: PCT/EP2020/068940

§ 371 (c)(1),
(2) Date: Jan. 14, 2022

(87) PCT Pub. No.: WO2021/013504

PCT Pub. Date: Jan. 28, 2021

(65) Prior Publication Data

US 2022/0258314 A1 Aug. 18, 2022

(30) Foreign Application Priority Data

Jul. 24, 2019 (SE) .................................... 1930252-0

(51) Int. Cl.
*B25B 23/147* (2006.01)
*B25B 21/00* (2006.01)

(52) U.S. Cl.
CPC .......... *B25B 23/147* (2013.01); *B25B 21/002* (2013.01)

(58) Field of Classification Search
CPC ....... B25B 13/48; B25B 13/481; B25B 17/00; B25B 17/02; B25B 21/00; B25B 21/002;
(Continued)

(56) References Cited

U.S. PATENT DOCUMENTS 4,619,162 A 10/1986 Van Laere
4,827,810 A 5/1989 Rushanan
(Continued)

FOREIGN PATENT DOCUMENTS

CN 107923804 A 4/2018
CN 110050180 A 7/2019
(Continued)

OTHER PUBLICATIONS

Atlas Copco Industrial Technique AB, International Patent Application No. PCT/EP2020/068940, International Search Report, Oct. 26, 2020.

(Continued)

*Primary Examiner* — Robert J Scruggs
(74) *Attorney, Agent, or Firm* — Moore & Van Allen PLLC; W. Kevin Ransom

(57) ABSTRACT

A power tool attachment part for a power tool, comprising: an elongate housing including an upper housing part and a lower housing part interconnected with the upper housing part. An input gear is configured to be connected to an output shaft of a power wrench, which input gear is arranged at a first end of the housing. An output gear has an output interface. The output gear is arranged at a second end of the housing. A first intermediate gear is arranged inside the housing and configured to transmit torque of the input gear to the output gear. The first intermediate gear is rotationally mounted on a first intermediate gear shaft. A torque sensor is configured to measure radial forces acting on the first intermediate gear shaft to thereby obtain a measure of the torque at the output gear.

16 Claims, 2 Drawing Sheets

(58) Field of Classification Search
CPC .............. B25B 23/142; B25B 23/1422; B25B 23/1425; B25B 23/147
See application file for complete search history.

(56) References Cited

U.S. PATENT DOCUMENTS

| | | | | |
|---|---|---|---|---|
| 5,355,751 | A * | 10/1994 | Specht | B25B 23/147 81/57.3 |
| 7,656,158 | B2 | 2/2010 | Fey et al. | |
| 8,727,941 | B2 | 5/2014 | Aoki | |
| 10,466,120 | B2 | 11/2019 | Groche et al. | |
| 2010/0269646 | A1 * | 10/2010 | Le Du | B25B 21/002 81/478 |
| 2012/0036970 | A1 * | 2/2012 | Chen | B25B 23/14 81/479 |
| 2012/0103142 | A1 * | 5/2012 | Sroka | B25B 17/02 81/57.3 |
| 2013/0074658 | A1 * | 3/2013 | Bowens | B25B 13/481 173/1 |
| 2013/0233131 | A1 | 9/2013 | Badiali | |
| 2014/0331829 | A1 * | 11/2014 | King | G01L 25/003 81/467 |
| 2015/0210112 | A1 * | 7/2015 | Lawton | B25B 23/1425 81/467 |
| 2015/0314427 | A1 * | 11/2015 | Carlsson | B25B 13/481 81/57.3 |
| 2019/0275681 | A1 | 9/2019 | Bhme et al. | |
| 2020/0061780 | A1 * | 2/2020 | Langhorst | B25B 17/00 |
| 2020/0290182 | A1 * | 9/2020 | Junkers | B25B 23/147 |
| 2021/0276163 | A1 * | 9/2021 | Eriksson | B25B 21/002 |

FOREIGN PATENT DOCUMENTS

| | | | |
|---|---|---|---|
| DE | 19854687 | A1 | 5/2000 |
| DE | 10206352 | A1 | 8/2003 |
| EP | 1160556 | A2 | 12/2001 |
| EP | 1918731 | A1 | 5/2008 |
| EP | 3388199 | A1 | 10/2018 |
| SU | 1247713 | A1 | 7/1986 |
| WO | 2015194609 | A1 | 12/2015 |
| WO | 2016023220 | A1 | 2/2016 |
| WO | 2018188829 | A1 | 10/2018 |

OTHER PUBLICATIONS

Atlas Copco Industrial Technique AB, International Patent Application No. PCT/EP2020/068940, Written Opinion, Oct. 26, 2020.
Atlas Copco Industrial Technique AB, International Patent Application No. PCT/EP2020/068940, International Preliminary Report on Patentability, Jan. 25, 2022.
Atlas Copco Industrial Technique AB, Chinese Patent Application No. 202080052693.2, Office Action, Mar. 8, 2023.
Atlas Copco Industrial Technique AB, Chinese Patent Application No. 202080052693.2, Second Office Action, Aug. 18, 2023.
Atlas Copco Industrial Technique AB, Swedish Patent Application No. 1930252-0, Search Report, Feb. 6, 2020.
Atlas Copco Industrial Technique AB, European Patent Application No. 20739910.6, Communication pursuant to Rule 114(2) EPC, Sep. 13, 2022.
Atlas Copco Industrial Technique AB, European Patent Application No. 20739910.6, Communication pursuant to Rule 114(2) EPC, Mar. 1, 2023.

* cited by examiner

POWER TOOL ATTACHMENT PART

CROSS-REFERENCE TO RELATED APPLICATIONS

This application is a National Stage patent application (filed under 35 § U.S.C. 371) of PCT/EP2020/068940, filed Jul. 6, 2020 of the same title, which, in turn claims priority to Swedish Patent Application No. 1930252-0 filed Jul. 24, 2019 of the same title; the contents of each of which are hereby incorporated by reference.

FIELD OF THE INVENTION

The present disclosure relates to a power tool attachment part for a power tool.

BACKGROUND OF THE INVENTION

Power tool attachment parts are generally used in confined spaces where it is not possible to use an ordinary power tool to access a bolt or nut of the joint to be tightened. A power tool attachment part is also known as a crowfoot, a front part attachment or an offset attachment.

A power tool attachment part includes a plurality of gear wheels that transmit a rotating movement from an input gear wheel to an output gear wheel. The gear wheels are generally located in a row, teeth against teeth, inside an elongate housing.

The torque in a power tool is typically measured by a transducer arranged inside the power tool. The internal measurement in the power tool may however not provide an accurate measurement of the torque that the power tool attachment part attached to the power tool is being subjected to.

EP3388199 discloses a screw device including a crowfoot connected to the screw device. The crowfoot has helical gear wheels provided with angled teeth. The crowfoot includes a torque transducer configured to measure the torque of the gear wheel arranged adjacent to the output gear wheel. The torque measurement is based on the axial movement of the helical gear wheel and the transducer utilizes a load cell to determine the torque.

The helical gear tooth structure is required to be able to perform the torque measurements. There are however crowfoots that utilize other gear wheel designs such as spur gear wheels with straight teeth.

SUMMARY OF THE INVENTION

An object of the present disclosure is to provide an attachment part with which solves or at least mitigates problems of the prior art.

There is hence provided a power tool attachment part for a power tool, comprising: an elongate housing including an upper housing part and a lower housing part interconnected with the upper housing part, an input gear configured to be connected to an output shaft of a power wrench, which input gear is arranged at a first end of the housing, an output gear with an output interface, which output gear is arranged at a second end of the housing, a first intermediate gear arranged inside the housing and configured to transmit torque of the input gear to the output gear, which first intermediate gear is rotationally mounted on a first intermediate gear shaft, and a torque sensor configured to detect radial forces acting on the first intermediate gear shaft to thereby obtain a measure of the torque at the output gear wheel.

The torque sensor is thus configured to detect and sense radial forces acting on the first intermediate gear shaft when a torque is transmitted to the output gear via the first intermediate gear. By this means a correct torque measurement may be achieved irrespective of the gear teeth configuration of the first intermediate gear, the input gear, the output gear and any additional intermediate gears. All gears may thus be provided with straight-cut teeth, i.e. so-called spur gears. This affords for an important advantage since such spur gears are considerably easier and cheaper to manufacture than the helical gears with angled teeth required by the prior art. However, the radial force detection also allows for that the gears may have any other suitable gear teeth configuration, such as e.g. helical gears, if that would be considered favourable for other reasons.

The torque sensor may be configured to measure radial deformation of the first gear shaft. Such radial deformation may be accurately determined by means of well proven and simple components such as piezo-electric elements and strain gauges.

The first intermediate gear may preferably mesh with the output gear. By this means the torque is measured close to the actual output torque such that a correct value of the output torque may easily be calculated.

The first intermediate gear shaft may be hollow, and the torque sensor may be received in the first intermediate gear shaft.

The torque sensor may comprise a piezo electric element.

Alternatively or in combination, the torque sensor may comprise a strain gauge.

The power tool attachment part may further comprise a number of second intermediate gears arranged inside the housing and configured to transmit torque of the input gear to the output gear. By selecting the number of intermediate gears, the length of the attachment part may be adapted for different applications.

The input gear, the output gear and the intermediate gear or gears may be spur gears.

Each intermediate gear may be mounted to the respective intermediate gear shaft by means of needle bearings.

The power tool attachment part may further comprise an electronics unit configured to receive measurements from the torque sensor.

The electronics unit may be configured to power the torque sensor. The electronics unit may for example comprise a battery or be configured to be connected by means of wires to the drive electronics of a power tool or to a control unit of a power tool.

The electronics unit may be configured to process the measurements. The electronics unit may hence comprise processing circuitry configured to process the measurements to e.g. determine the torque based on the measurements of the radial forces acting on the first intermediate gear shaft.

The electronics unit may be configured to transmit the measurements to a control unit of a power tool.

According to one embodiment the power tool attachment part is a crowfoot.

Other features and advantages of the present disclosure will be apparent from the figure and from the detailed description of the shown embodiments.

BRIEF DESCRIPTION OF THE DRAWINGS

In the following detailed description reference is made to the accompanying drawings, of which.

DETAILED DESCRIPTION OF THE INVENTION

Figure 1:
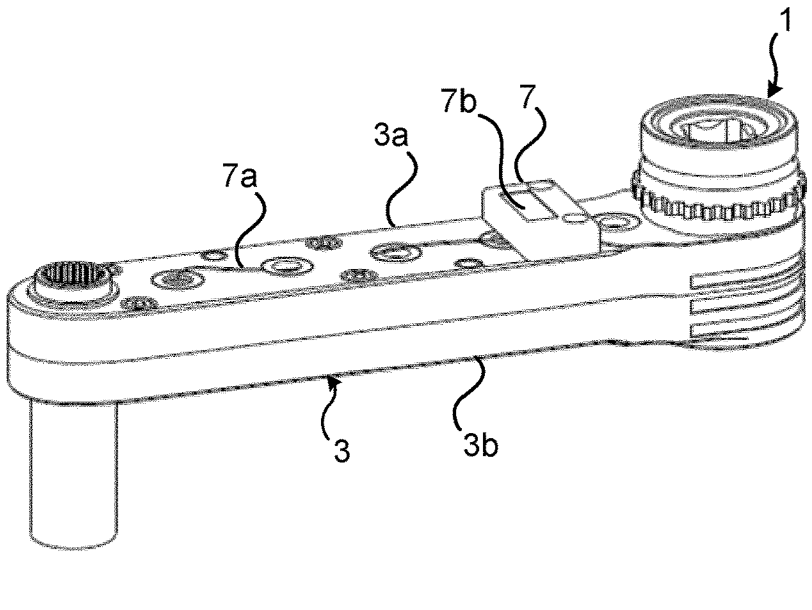
FIG. 1 shows a perspective view of an example of a power tool attachment part.

FIG. 1 depicts an example of a power tool attachment part 1 for a power tool. The power tool may for example be a wrench or a nut runner.

The exemplified power tool attachment part 1 is a crowfoot. The power tool attachment part 1 comprises an elongate housing 3. The elongate housing 3 comprises an upper housing part or first housing part 3*a* and a lower housing part or second housing part 3*b*. The upper housing part 3*a* is interconnected with the lower housing part 3*b*.

Figure 2:
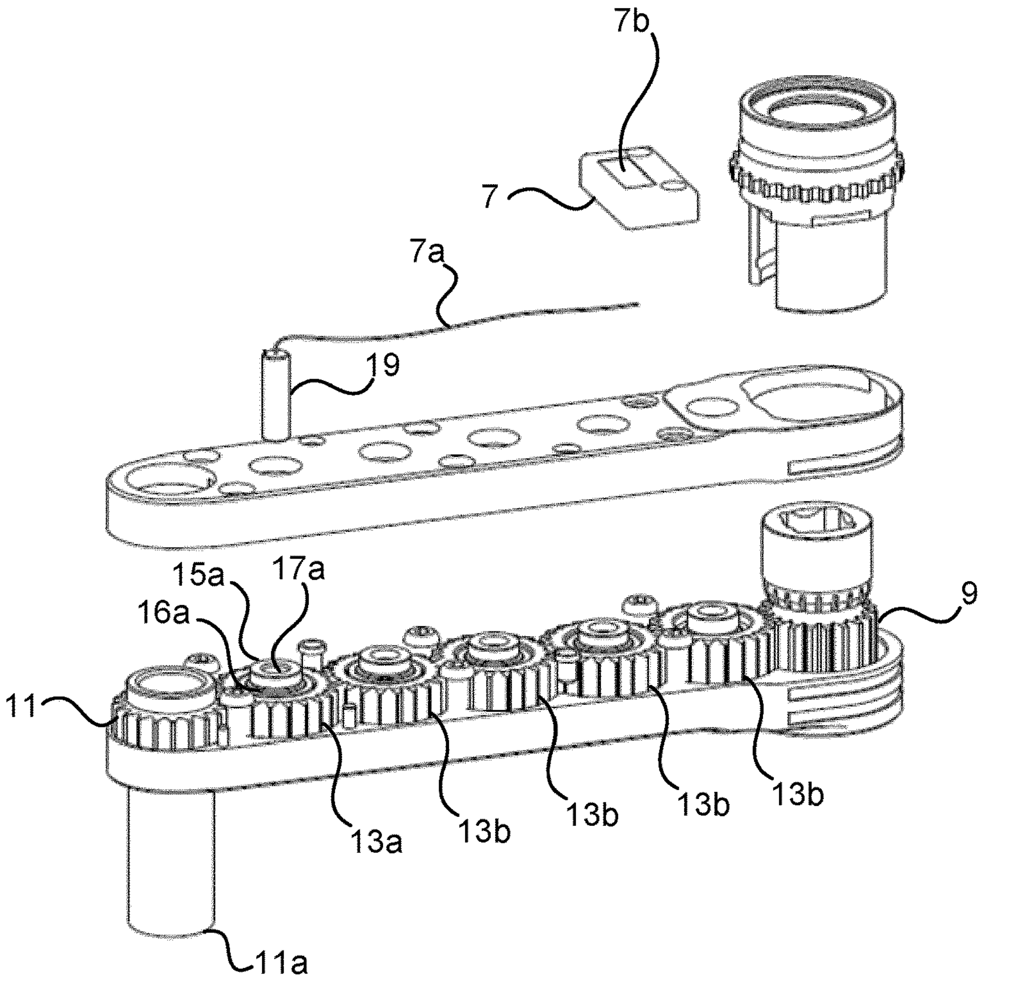
FIG. 2 is an exploded view of the power tool attachment part in FIG. 1.
Figure 3:
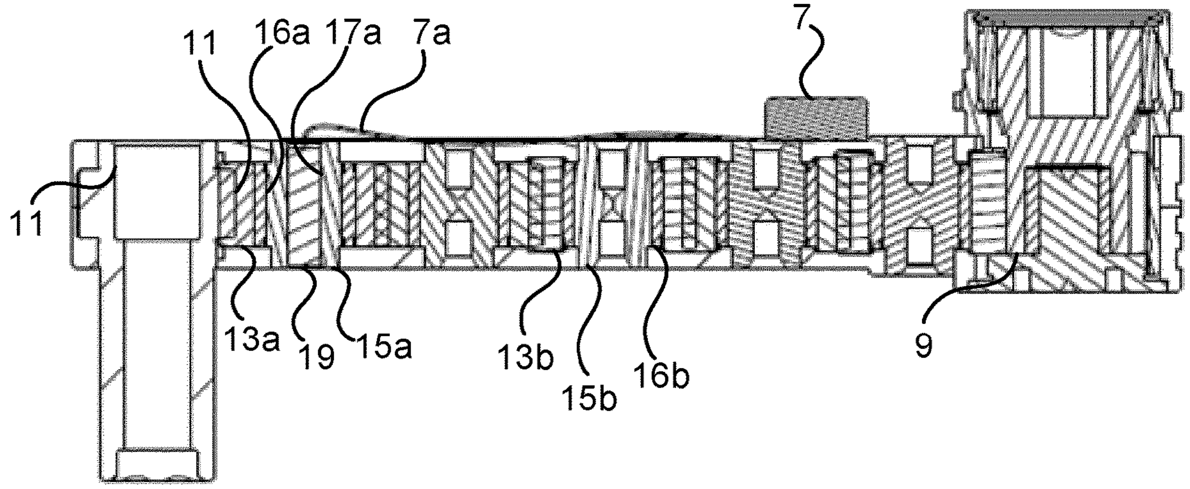
FIG. 3 is a longitudinal section of the power tool attachment part in FIG. 1.

FIG. 2 shows the power tool attachment part 1 in an exploded view. The power tool attachment part 1 comprises an input gear wheel or, shorter, input gear 9 and an output gear 11 arranged in the elongate housing 3. The input gear 9 is arranged at a first end of the elongate housing 3. The output gear 9 is arranged at a second end of the housing 3.

The input gear 9 is drivingly connected to the output gear 11 via a number of intermediate gear 13*a*, 13*b*. In the shown example there are five intermediate gears comprising one first intermediate gear 13*a*, meshing with the output gear 11 and four second intermediate gears arranged between the input gear 9 and the first intermediate gear 13*a* for transmitting rotation and torque therebetween. The number of intermediate gears may however be varied freely for suitable adaption of the length of the crowfoot, as long as there is one first intermediate gear 13. The number of second intermediate gears 13*b* may thus be any integer from zero and up. In the shown example all gears are spur gears.

The output gear wheel 11 comprises an output connection or interface 11*a*. The output interface 11*a* may be configured to receive for example a wrench bit, a screw bit, a nut or screw head.

The first intermediate gear 13*a* is rotationally mounted to a first intermediate gear shaft 15*a* by means of needle bearings 16*a*. Correspondingly, each second intermediate gear 13*b* rotationally mounted to a second intermediate gear shaft 15*b* by means of a respective needle bearing 16*b*.

The first intermediate gear shaft 15*a* is hollow. In the shown example it exhibits a cylindrical bore 17*a* which extends axially from one end to the other of the first intermediate gear shaft 15*a*. At alternative embodiments however, the hollow configuration of the first intermediate gear shaft may be achieved by an internal space of any cross-section geometry which does or does not extend over the entire axial length of the first intermediate shaft.

A torque sensor 19 is received in the bore 17*a*. In the shown example, the torque sensor is formed of a piezo-electric element which is inserted in the bore and fixed therein by any suitable means such as by gluing, press-fitting or by additional fixation elements. In the shown example the piezo-electric element has essentially the same cross-section geometry as the bore 17*a*.

The piezo-electric element is configured to detect radial deformations of the first intermediate gear shaft 15*a* and to generate an electrical signal which is proportional to the radial deformation. Such radial deformations occur when an input torque is transmitted from the input gear via the second intermediate gears 13*b* to the first intermediate gear 13*a* and when the output gear generates a counter-torque to the first intermediate gear 13*a*. The deformation of the first intermediate gear shaft 15*a* and thus the signal generated by the torque sensor 19 is then proportional to the counter-torque generated by the output gear 11 and the actual torque acting on the output gear may thereby be calculated.

At a not shown alternative embodiment, the torque sensor is formed of or comprises a strain gauge which is received in the internal space of the first intermediate gear shaft. The strain gauge may e.g. comprise a thin film sensor fixed to the inside wall of the first intermediate gear shaft or to a pin, needle or the like inserted in the internal space of the first intermediate gear shaft.

The power tool attachment part 1 may optionally comprise an electronics unit 7. The torque sensor 19 is connected to the electronics unit 7 by means of an electric wire 7*a*. The electronics unit 7 may be configured to power the torque sensor 19. The electronics unit 7 may be configured to receive measurements from the torque sensor 19. The electronics unit 7 may be configured to process measurements from the torque sensor 19. For example, the electronics unit 7 may be configured to process the measurements or detections made by the piezo-electric element and determine the torque corresponding to the radial deformation of the first intermediate gear shaft 15*a*.

The electronics unit 7 may be configured to communicate wirelessly or by means of wires with a power tool, and/or to communicate wirelessly or by means of wires with a control unit configured to control the operation of the power tool. The electronics unit 7 may be configured to transmit unprocessed measurements and/or the processed measurements. Optionally, the electronics unit 7 may comprise a display unit 7*b* configured to display processed measurements from the torque sensor 19. The electronics unit 7 may be arranged on the outer surface of the elongate housing 3, for example on the upper housing part 3*a*.

The torque sensor 19 could alternatively be configured to be electrically connected directly to the power tool and fed with power from the power tool.

At the embodiment shown in the figures, the first intermediate gear meshes with the output gear. This may be preferable since the signal generated by the torque sensor then closely corresponds to the actual torque acting on the output gear. In alternative embodiments however, the first intermediate gear may be any of the intermediate gears such that it meshes with the input gear and/or with one or two of the second intermediate gears. At such alternatives, the friction generated at meshing of the gears, between the first intermediate gear and the output gear need to be compensated for when determining the actual torque acting on the output gear.

The electronics unit 7 may comprise processing circuitry configured to process measurements from the torque sensor 19. Further, the electronics unit 7 may comprise a storage medium comprising computer code which when executed by the processing circuitry causes the electronics unit 7 to determine a torque at the output gear wheel based on the measurements from the torque sensor 5. The processing circuitry may be configured to display the determined torque on a display 7*b* of the electronics unit 7.

The processing circuitry may use any combination of one or more of a suitable central processing unit (CPU), multiprocessor, microcontroller, digital signal processor (DSP), application specific integrated circuit (ASIC), field programmable gate arrays (FPGA) etc., capable of executing any herein disclosed operations concerning the determination of the torque based on the measurements made by the torque sensor 19.

The storage medium may for example be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory.

The electronics unit 7 may comprise a transmitter configured to wirelessly transmit measurements received from the torque sensor to a power tool or a control unit of a power tool, for example.

Above, the inventive concept has been described with reference to two specific embodiments. The inventive concept is however not limited to either of these embodiments. It is obvious to a person skilled in the art that the inventive concept may be modified within its scope, which is defined by the following claims.

The invention claimed is:

1. A power tool attachment part for a power tool, comprising:

an elongate housing including an upper housing part and a lower housing part interconnected with the upper housing part;

an input gear configured to be connected to an output shaft of a power wrench, which input gear is arranged at a first end of the housing;

an output gear with an output interface, which output gear is arranged at a second end of the housing;

a first intermediate gear arranged inside the housing and configured to transmit torque of the input gear to the output gear, which first intermediate gear is rotationally mounted on a first intermediate gear shaft;

a torque sensor configured to detect radial forces acting on the first intermediate gear shaft to thereby obtain a measure of the torque at the output gear, wherein the torque sensor comprises a piezo-electric element or a strain gauge; and an electronics unit configured to receive measurements from the torque sensor and transmits the measurements to a control unit associated with and configured to remotely control operation of the power tool.

2. The power tool attachment part according to in claim 1, wherein the torque sensor is configured to measure radial deformation of the first intermediate gear shaft.

3. The power tool attachment part according to claim 1, wherein the first intermediate gear meshes with the output gear.

4. The power tool attachment part according to claim 1, wherein at least a portion of the first intermediate gear shaft is hollow, and the torque sensor is received in the hollow portion of the first intermediate gear shaft.

5. The power tool attachment part according to claim 1, wherein at least a portion of the first intermediate gear shaft is hollow and the torque sensor is received in the hollow portion of the first intermediate gear shaft, and wherein the torque sensor is configured to measure radial deformation of the first intermediate gear shaft.

6. The power tool attachment part according to claim 1, wherein the torque sensor is located in the first intermediate gear shaft.

7. The power tool attachment part according to claim 1, further comprising a number of second intermediate gears arranged inside the housing and configured to transmit torque of the input gear to the output gear.

8. The power tool attachment part according to claim 1, wherein the input gear, the output gear and the intermediate gear are spur gears.

9. The power tool attachment part according to claim 1 comprising a plurality of intermediate gears each mounted to a respective intermediate gear shaft of a plurality of intermediate gear shafts by means of a needle bearing.

10. The power tool attachment part according to claim 1, wherein the electronics unit is configured to power the torque sensor.

11. The power tool attachment part according to claim 1, wherein the power tool attachment part is a crowfoot.

12. The power tool attachment part according to claim 1, wherein the electronics unit is configured to transmit outputs from the piezo-electric element or strain gauge to the control unit.

13. The power tool attachment part according to claim 1, wherein the electronics unit is configured to process measurements from the torque sensor and determine a torque value and transmit the determined torque value to the control unit.

14. The power tool attachment part according to claim 1, wherein the electronics unit comprises a transmitter configured to transmit the measurements to the control unit wirelessly.

15. The power tool attachment part according to claim 1, wherein the electronics unit comprises a transmitter configured to transmit the measurements to the control unit via a wire.

16. The power tool attachment part according to claim 1, wherein the electronics unit is configured to transmit the measurements to a power tool.

* * * * *